US011067032B2

(12) United States Patent
Hirano et al.

(10) Patent No.: US 11,067,032 B2
(45) Date of Patent: Jul. 20, 2021

(54) PISTON

(71) Applicant: TOYOTA JIDOSHA KABUSHIKI KAISHA, Toyota (JP)

(72) Inventors: Takuzo Hirano, Nagoya (JP); Ichiro Yamaguchi, Toyota (JP); Nobuhiko Soda, Okazaki (JP); Hironori Aoyama, Toyota (JP); Kazuya Mikashima, Nagoya (JP); Hiroyuki Ito, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/079,881

(22) Filed: Oct. 26, 2020

(65) Prior Publication Data

US 2021/0189995 A1 Jun. 24, 2021

(30) Foreign Application Priority Data

Dec. 24, 2019 (JP) ............................. JP2019-233460

(51) Int. Cl.
*F02F 3/00* (2006.01)
*F16J 1/00* (2006.01)
*F02F 11/00* (2006.01)

(52) U.S. Cl.
CPC .......... *F02F 3/0015* (2013.01); *F02F 11/005* (2013.01)

(58) Field of Classification Search
CPC . F02F 3/0015; F02F 3/10; F02F 11/005; F16J 1/005; F16J 1/04; F16J 1/08; F16J 1/09
See application file for complete search history.

(56) References Cited

U.S. PATENT DOCUMENTS

| | | | | | |
|---|---|---|---|---|---|
| 2,344,416 | A | * | 3/1944 | Scheibe | F16J 1/02 92/192 |
| 2,438,243 | A | * | 3/1948 | Zoromskis | F16J 1/02 92/158 |
| 4,075,934 | A | * | 2/1978 | Wacker | F02F 3/10 92/158 |
| 4,513,697 | A | * | 4/1985 | Moiroux | F02F 3/18 123/193.6 |
| 4,987,865 | A | * | 1/1991 | Schenkel | F02F 1/20 123/193.6 |
| 5,195,478 | A | * | 3/1993 | Kawabata | F02F 3/10 123/193.4 |

(Continued)

FOREIGN PATENT DOCUMENTS

| | | | |
|---|---|---|---|
| JP | 2008-231972 | A | 10/2008 |
| JP | 2009-030521 | A | 2/2009 |

(Continued)

*Primary Examiner* — Grant Moubry
(74) *Attorney, Agent, or Firm* — Finnegan, Henderson, Farabow, Garrett & Dunner, LLP

(57) ABSTRACT

A piston includes: a piston head; and a piston skirt connected to the piston head, wherein the piston skirt includes wall portions protruding outward from a surface of the piston skirt, the wall portions adjacent to each other in a circumferential direction of the piston skirt are inclined in directions opposite to each other with respect to a direction of movement of the piston in a bore for the piston, and define a tapered portion, and the tapered portions are spaced away from each other in the circumferential direction of the piston skirt.

8 Claims, 5 Drawing Sheets

(56) References Cited

U.S. PATENT DOCUMENTS

| | | | | |
|---|---|---|---|---|
| 7,171,936 | B2 * | 2/2007 | Rein | C23C 4/16 123/193.4 |
| 7,415,961 | B1 * | 8/2008 | Chen | F16J 1/08 123/193.6 |
| 8,069,773 | B2 * | 12/2011 | Suzuki | F01M 11/00 92/158 |
| 8,356,550 | B2 * | 1/2013 | Kim | F16J 1/04 92/159 |
| 8,640,669 | B2 * | 2/2014 | Nakazawa | F02F 3/027 123/193.6 |
| 8,794,208 | B2 * | 8/2014 | Fiedler | F02F 3/10 123/193.6 |
| 9,086,030 | B2 * | 7/2015 | Suzuki | F02F 3/027 |
| 9,086,147 | B2 * | 7/2015 | Pegg | F16J 1/09 |
| 9,581,105 | B2 * | 2/2017 | Kuniyasu | F16J 1/08 |
| 9,828,938 | B2 * | 11/2017 | Suda | F02F 3/022 |
| 10,018,147 | B2 * | 7/2018 | Oso | F02F 3/10 |
| 10,161,353 | B2 * | 12/2018 | Oso | F02F 3/10 |
| 2009/0025549 | A1 | 1/2009 | Suzuki et al. | |
| 2019/0063604 | A1 * | 2/2019 | Taresawa | F16J 1/08 |

FOREIGN PATENT DOCUMENTS

| | | | |
|---|---|---|---|
| JP | 2015-121155 | A | 7/2015 |
| JP | 2018-109365 | A | 7/2018 |

* cited by examiner

PISTON

CROSS-REFERENCE TO RELATED APPLICATION

This application is based upon and claims the benefit of priority of the prior Japanese Patent Application No. 2019-233460, filed on Dec. 24, 2019, the entire contents of which are incorporated herein by reference.

TECHNICAL FIELD

The present disclosure relates to a piston.

BACKGROUND

A piston reciprocates in a bore of an internal combustion engine. The piston and the bore are lubricated to reduce friction. There is a technique in which a wavy groove provided in a circumferential direction on a surface of a piston skirt suppresses oil from leaking in the circumferential direction (for example, Japanese Unexamined Patent Application Publication No. 2008-231972).

However, oil might leak upward from the piston due to the reciprocating motion of the piston. The leaked oil might enter a combustion chamber and burn together with fuel or the like. This might increase oil consumption and degrade exhaust emission.

SUMMARY

An object of the present disclosure is to provide a piston capable of suppressing oil leakage. It is therefore an object of the present disclosure to provide a piston including: a piston head; and a piston skirt connected to the piston head, wherein the piston skirt includes wall portions protruding outward from a surface of the piston skirt, the wall portions adjacent to each other in a circumferential direction of the piston skirt are inclined in directions opposite to each other with respect to a direction of movement of the piston in a bore for the piston, and define a tapered portion, and the tapered portions are spaced away from each other in the circumferential direction of the piston skirt.

DETAILED DESCRIPTION

Figure 1A:
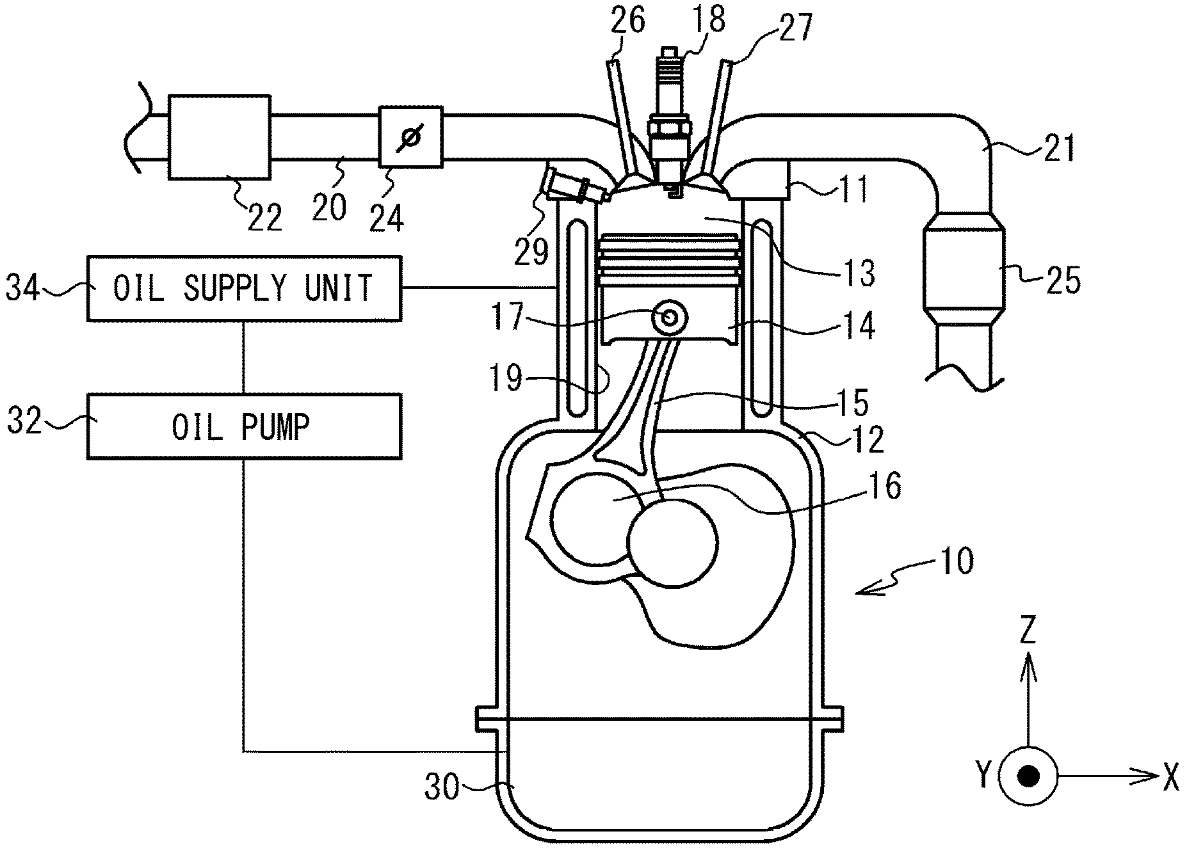
FIG. 1A is a schematic view of an internal combustion engine.

Hereinafter, a description will be given of a piston according to the present embodiment with reference to the drawings. First, a description will be given of an internal combustion engine to which a piston is assembled. FIG. 1A is a schematic view of an internal combustion engine 10. The internal combustion engine 10 includes, for example, a cylinder head 11, a cylinder block 12, a piston 14, a crankshaft 16, and an oil pan 30. The internal combustion engine 10 may be a gasoline engine or a diesel engine. The cylinder head 11, the cylinder block 12, the piston 14, and a connecting rod 15 are made of a metal such as an aluminum alloy.

The cylinder head 11 is mounted on the cylinder block 12. The oil pan 30 is disposed below the cylinder block 12. The crankshaft 16 is housed in the cylinder block 12. An ignition plug 18 and a fuel injection valve 29 are provided in the cylinder head 11.

One end of the connecting rod 15 is connected to the piston 14 by a pin 17, and the other end is connected to the crankshaft 16. The piston 14 is slidably housed in a bore 19 of the cylinder block 12. A combustion chamber 13 is defined in the bore 19 by the piston 14. A direction in which the pin 17 is inserted is defined as a Y-axis direction. A direction of movement of the piston 14 is defined as a Z-axis direction. A direction perpendicular to the Y-axis direction and the Z-axis direction is defined as an X-axis direction. One side in the Z-axis direction may be described as an upper side, and the other side in the Z-axis direction may be described as a lower side.

An intake passage 20 and an exhaust passage 21 are connected to the cylinder head 11. The intake passage 20 is provided with an air cleaner 22 and a throttle valve 24 in order from the upstream side, and may further be provided with an air flow meter and the like. A catalyst 25 is provided in the exhaust passage 21.

Intake air flowing through the intake passage 20 is purified by the air cleaner 22, and is introduced into the combustion chamber 13 when an intake valve 26 opens. The fuel injection valve 29 injects fuel into the combustion chamber 13. The ignition plug 18 ignites an air-fuel mixture. When an exhaust valve 27 opens, exhaust gas generated by combustion is discharged to the exhaust passage 21. The catalyst 25 is, for example, a three-way catalyst and purifies the exhaust gas.

Combustion in the combustion chamber 13 causes the piston 14 to move downward, and then power is transmitted from the piston 14 to the crankshaft 16 through the connecting rod 15. Rotation of the crankshaft 16 and combustion in the combustion chamber 13 cause the piston 14 to reciprocate upward and downward in the bore 19.

Oil maintains lubrication between the piston 14 and an inner wall of the bore 19. Oil is stored in the oil pan 30 and is pumped from the oil pan 30 by an oil pump 32. An oil supply unit 34 is, for example, an oil jet or the like, and injects oil supplied from the oil pump 32 into the combustion chamber 13.

Figure 1B:
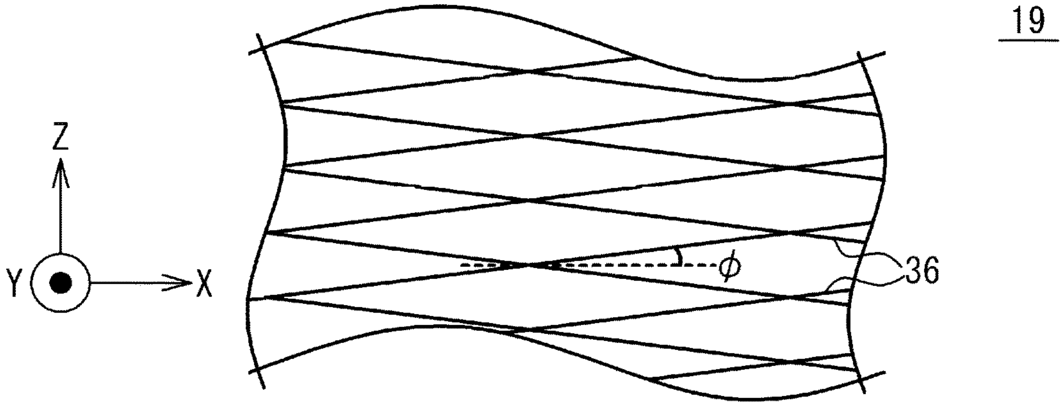
FIG. 1B is a front view of an inner wall of a bore.

FIG. 1B is a front view of the inner wall of the bore 19. As illustrated in FIG. 1B, grooves 36 are provided on the inner wall of the bore 19. The grooves 36 intersect each other to form a cross hatch. The groove 36 is inclined at an angle $\varphi$ with respect to the X-axis direction indicated by a dotted line in FIG. 1B. Oil is held by the grooves 36, and then oil film is formed between the piston 14 and the inner wall of the bore 19.

Figure 2A:
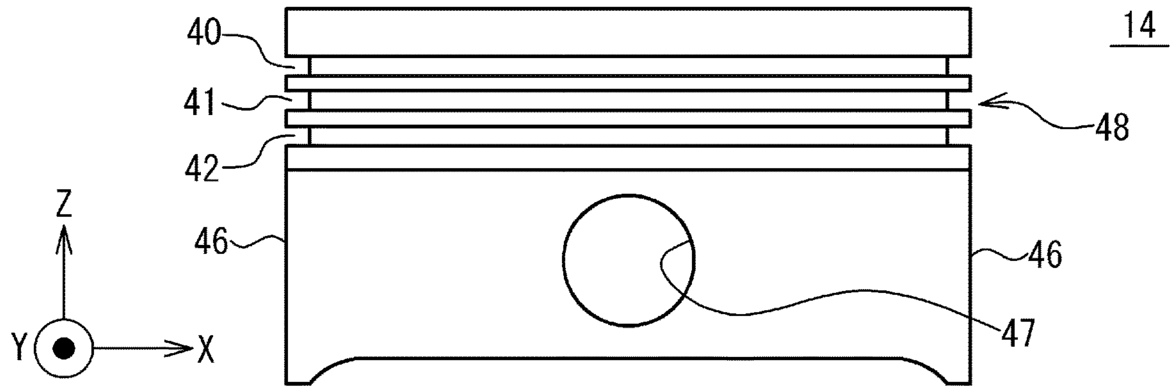
FIGS. 2A and 2B are views of a piston.
Figure 2B:
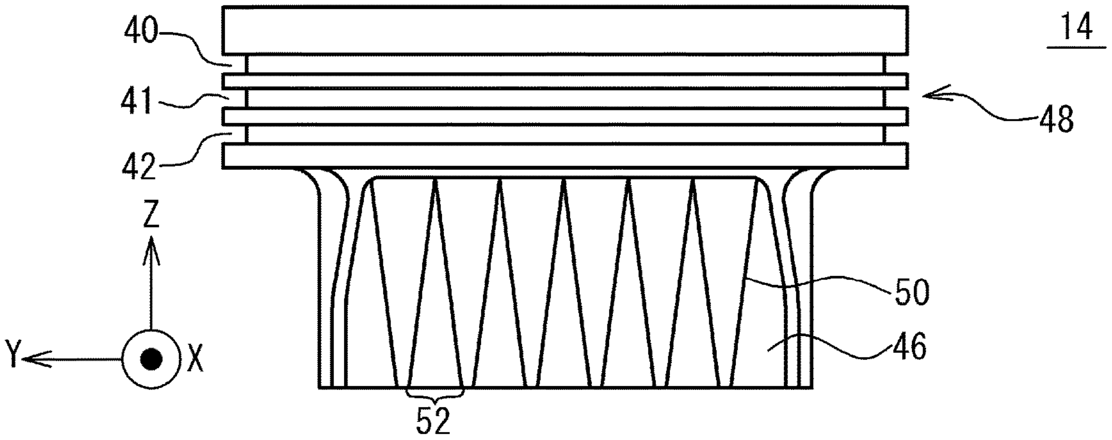
Figure 2C:
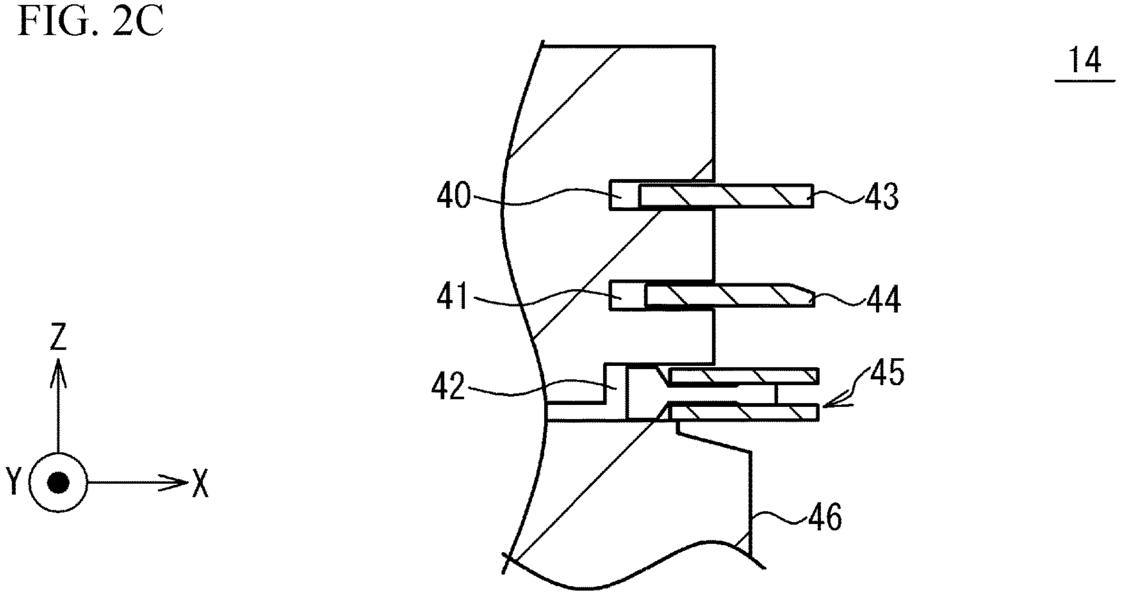
FIG. 2C is an enlarged view of piston rings.

FIGS. 2A and 2B are views illustrating the piston 14 in a state where piston rings 43 to 45 are removed. FIG. 2A illustrates an XZ plane side of the piston 14, and FIG. 2B illustrates a YZ plane side thereof. FIG. 2C is an enlarged view of the piston 14 in a state where the piston rings 43 to 45 are mounted.

As illustrated in FIGS. 2A to 2C, the piston 14 includes, for example, a piston skirt 46, a hole 47, and a piston head 48. The piston head 48 is provided with three grooves 40, 41 and 42. The grooves 40, 41 and 42 surrounding the piston 14 are arranged in this order from the upper side to the lower side. As illustrated in FIG. 2C, the piston ring 43 is mounted in the groove 40, a piston ring 44 is mounted in the groove 41, and a piston ring 45 is mounted in the groove 42.

The piston skirt 46 is connected below the piston head 48 and is located at both sides with respect to the X axis. When the piston 14 is disposed in the bore 19, the grooves 40 to 42 are located at the combustion chamber 13 side in the piston, and the piston skirt 46 is located on the side opposite to the combustion chamber 13. The hole 47 illustrated in FIG. 2A penetrates the piston 14 in the Y-axis direction. The pin 17 illustrated in FIG. 1 is inserted into the hole 47.

When the piston 14 reciprocates in the bore 19 in the vertical direction, the piston rings 43 to 45 push oil upward and remove oil downward. A part of oil is dropped into the oil pan 30 illustrated in FIG. 1A, and then is supplied to the internal combustion engine 10 again by the oil supply unit 34.

If oil leaks from gaps between the piston rings 43 to 45 and the inner wall portions of the grooves 40 to 42 of the piston 14 toward the combustion chamber 13 when the piston 14 moves from the upper side to the lower side, the oil burns together with intake air and the like in the combustion chamber 13. This makes it difficult to reuse oil to increase oil consumption. Also, the burning of oil might increase pollutants in the exhaust gas.

In the present embodiment, in order to reduce oil consumption and improve exhaust emission, the piston skirt 46 is provided with wall portions 50 as illustrated in FIG. 2B, and the wall portions 50 defines a tapered portion 52. This suppresses oil leakage toward the combustion chamber 13. As illustrated in FIG. 2A, the piston skirt 46 and the wall portion 50 are not provided on a surface of the piston 14 where the hole 47 is provided.

Figure 3A:
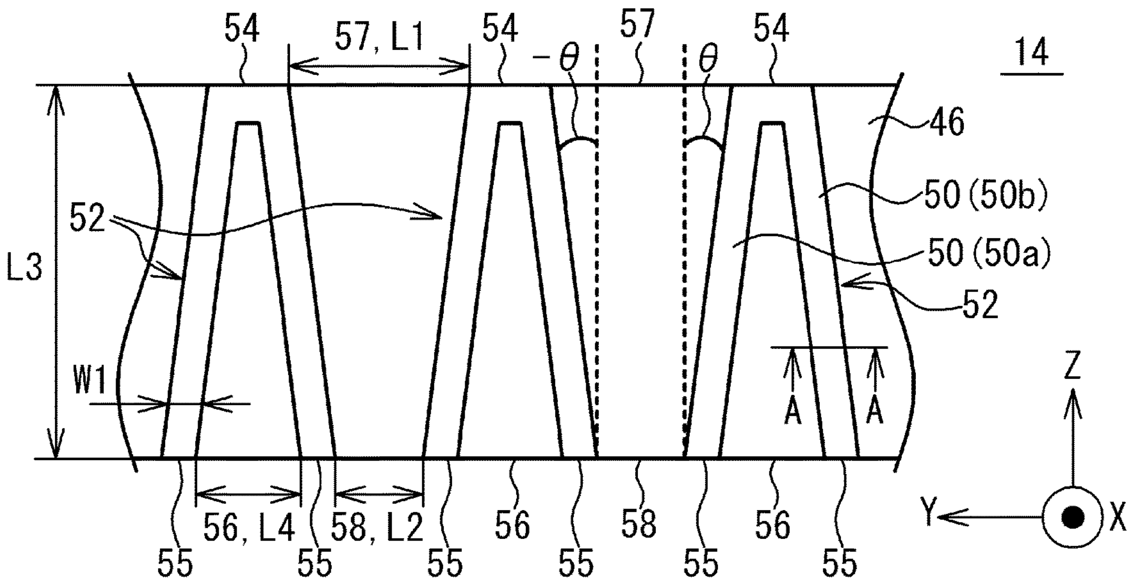
FIG. 3A is an enlarged view of a piston skirt.

FIG. 3A is an enlarged view of the piston skirt 46. The wall portion 50 extends straight from one end (upper end) of the piston skirt 46 to the other end (lower end) in the Z-axis direction. A part of the wall portion 50 inclined at an angle θ with respect to the Z-axis direction is represented with a wall portion 50*a*. A part of the wall portion 50 inclined at an angle −θ is represented with as a wall portion 50*b*. The wall portions 50*a* and 50*b* are alternately and periodically arranged from one end to the other end of the piston 14 in the circumferential direction (Y-axis direction). A width W1 of the wall portion 50 in the Y-axis direction is constant at any position thereof.

The wall portions 50*a* and 50*b* adjacent to each other define the tapered portion 52. An upper end portion of the wall portion 50*a* and an upper end portion of the wall portion 50*b* are connected to each other, and define an upper end portion 54 of the tapered portion 52. A lower end portion of the wall portion 50*a* and a lower end portion of the wall portion 50*b* are separated from each other, and define a lower end portion 55 of the tapered portion 52. The upper end portion 54 of the tapered portion 52 is located at the upper end portion of the piston skirt 46. The lower end portion 55 of the tapered portion 52 is located at the lower end portion of the piston skirt 46. The tapered portion 52 has a V shape that tapers upward and widens downward. A gap 56 is defined between the two lower end portions 55 of the tapered portion 52.

The tapered portions 52 are arranged in the circumferential direction of the piston skirt 46. The tapered portions 52 adjacent to each other are separated from each other, extend upward away from each other, and extend downward close to each other. A gap 57 is defined between the upper end portions 54 of the adjacent tapered portions 52. A gap 58 is defined between the lower end portions 55 of the adjacent tapered portions 52.

A distance L1 between the upper end portions 54 of the adjacent tapered portions 52 is greater than the width W1 of the wall portion 50 in the Y-axis direction. The distance L1 is greater than a distance L2 between the lower end portions 55 of the adjacent tapered portions 52. The distance L1 is greater than a distance L4 of the gap 56 in the tapered portion 52. The distance L1 is, for example, 5 to 10 times the width W1. The distance L2 between the lower end portions 55 of the adjacent tapered portions 52 is smaller than the distance L1. The distance L2 is smaller than the distance L4. The distance L2 is, for example, half or less, one third or less, quarter or less of the distance L1. A decrease in the distance L2 suppresses oil leakage toward the combustion chamber 13 as described later. A length L3 of the tapered portion 52 in the Z-axis direction is, for example, equal to the length of the piston skirt 46.

The distance L1 is, for example, 500 μm. The distance L2 between the lower end portions 55 is, for example, 200 μm. The length L3 of the piston skirt 46 is, for example, 25 mm. The length of the piston head 48 is, for example, 20 mm. The width W1 of the wall portion 50 is, for example, not less than 50 μm and not more than 100 μm. A diameter of the piston 14 is, for example, 80 mm.

Figure 3B:
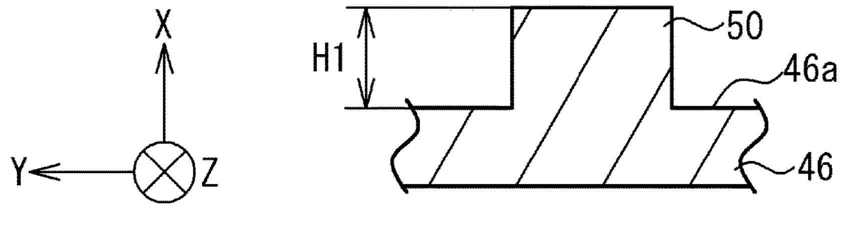
FIG. 3B is a cross-sectional view of a wall portion.

FIG. 3B is a cross-sectional view of the wall portion 50, and illustrates a cross section taken along A-A line of FIG. 3A. The wall portion 50 protrudes outward from a surface 46*a* of the piston skirt 46 and has a rectangular shape in cross section. A height H1 of the wall portion 50 with respect to the surface 46*a* is, for example, not less than 100 μm and not more than 200 μm, and is 0.5 times or more the distance L2 and not more than the distance L2. The wall portion 50 is formed by cutting a portion of the surface of the piston skirt 46 other than a portion to be formed as the wall portion 50 with a laser beam or the like. That is, the portion that is not cut is to be formed as the wall portion 50.

Next, the flow of oil when the piston 14 moves will be described. When the piston 14 moves from the upper side to the lower side in the bore 19, oil does not tend to flow from the lower side to the upper side. When the piston 14 moves from the lower side to the upper side in the bore 19, oil tends to flow from the upper side to the lower side.

Details will be described. The wall portion 50*a* and the wall portion 50*b* are connected to each other at the upper end portion 54 of the tapered portion 52. The upper end portions 54 of the adjacent tapered portions 52 are separated from each other with the gap 57 therebetween. The distance L1 between the upper end portions 54 is greater than the distance L2 between the lower end portions 55. Therefore, when the piston 14 moves upward from the lower side, oil tends to flow from the upper side to the lower side through the gap 57 between the tapered portions 52. A part of oil flows downward from the gap 58 to the oil pan 30 and is reused.

On the other hand, the distance L2 between the lower end portions 55 of the adjacent tapered portions 52 is smaller than the distance L1 between the upper end portions 54. For this reason, when the piston 14 moves downward from the upper side, oil does not tend to flow into the narrow gap 58, which suppresses oil from flowing upward. Oil flowing through the gap 56 is blocked by the wall portion 50. Thus, oil does not tend to flow upward from the lower side, which suppresses oil leakage toward the combustion chamber 13.

According to the present embodiment, the piston skirt 46 is provided with the wall portions 50*a* and 50*b*. The wall portion 50*a* and the wall portion 50*b* are inclined in directions opposite to each other, are connected to each other at the combustion chamber 13 side of the piston 14, and are separated from each other at a side opposite to the combustion chamber 13, thereby defining the tapered portion 52. The tapered portions 52 are separated from each other. The gap 58 between the lower end portions 55 of the adjacent tapered portions 52 is smaller than the gap 57 between the upper end portions 54 thereof. Thus, when the piston 14 moves from the upper side to the lower side, oil does not tend to flow upward from the gap 58. This suppresses oil leakage above the piston skirt 46. Oil does not tend to enter the combustion chamber 13. It is thus possible to reduce oil consumption and suppress deterioration of exhaust emission.

The wall portions 50*a* and 50*b* may be separated from each other at the upper end portion 54 of the tapered portion 52, and a small gap smaller than the gap 58 may be generated between the wall portions 50*a* and 50*b*. However, when the gap at the upper end portion 54 increases, the tapered portion 52 comes to have a vertically symmetrical shape. In this case, a degree to which oil flows from the upper side to the lower side might be comparable to a degree to which oil flows from the lower side to the upper side, so that it might difficult to suppress oil leakage. Therefore, as illustrated in FIG. 3A, the wall portions 50*a* and 50*b* are connected to each other at the upper end portion 54 and a gap is not defined. Oil tends to flow from the upper side to the lower side, and oil does not tend to flow from the lower side to the upper side. This suppresses oil leakage, and drops oil into the oil pan 30 to be reused.

If the gap 58 between the lower end portions 55 is wide, oil tends to flow upward from the gap 58. In order to make it difficult for oil to flow, the tapered portions 52 are made close to each other so as to narrow the gap 58. The distance L2 between the lower end portions 55 (the width of the gap 58) may be smaller than each of the distance L1 between the upper end portions 54 and the distance L4 of the gap 56. The distance L2 may be, for example, not more than half of the distance L1, not more than one third thereof, not more than quarter thereof. The narrowing of the gap 58 effectively suppresses oil leakage toward the combustion chamber 13.

The inclination angle θ of the wall portion 50*a* with respect to the Z-axis direction is, for example, 15 degrees, and may be 10 degrees to 30 degrees. The inclination angle of the wall portion 50*b* is −θ, and the magnitude of the inclination angle thereof is equal to the magnitude of the inclination angle of the wall portion 50*a*. The inclination angle θ approaches the inclination angle φ of the groove 36 on the inner wall of the bore 19 with respect to the X-axis direction, so that the tapered portion 52 tends to catch oil.

The number of the tapered portions 52 is two or more, and may be, for example, five or more. Particularly, as illustrated in FIG. 2B, the wall portions 50 may be arranged from one end to the other end of the piston skirt 46 in the circumferential direction (Y-axis direction). That is, the number of the wall portions 50 is two or more, and the wall portions 50 are entirely provided in the circumferential direction. Oil flow is controlled to suppress oil leakage over the circumferential direction of the piston skirt 46.

Figure 4A:
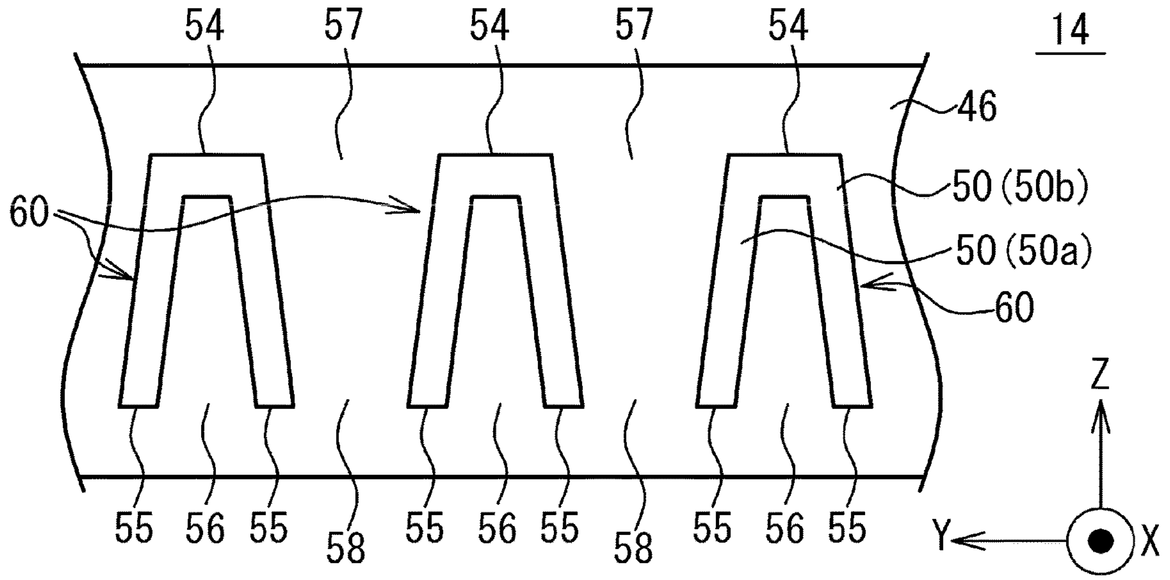
FIG. 4A is an enlarged view of a piston skirt according to a first variation.

FIG. 4A is an enlarged view of the piston skirt 46 according to a first variation. In the example of FIG. 4A, the wall portions 50*a* and 50*b* do not reach the upper end and the lower end of the piston skirt 46. The upper end portion 54 of a tapered portion 60 defined by the wall portions 50*a* and 50*b* is located below the upper end portion of the piston skirt 46. The lower end portion 55 of the tapered portion 60 is located above the lower end portion of the piston skirt 46. One of the upper end portions 54 and the lower end portions 55 is located at the end portion of the piston skirt 46, and the other may not be located at the end portion of the piston skirt 46 necessarily. In this way, the length of the wall portion 50 may be changed.

However, as illustrated in FIG. 3A, the wall portions 50*a* and 50*b* extend from the upper end to the lower end of the piston skirt 46. That is, the upper end portion 54 of the tapered portion 52 is located at the upper end portion of the piston skirt 46, and the lower end portion 55 of the tapered portion 52 is located at the lower end portion of the piston skirt 46. The oil flow is entirely controlled over the piston skirt 46 in the vertical direction, thereby more effectively suppressing upward leakage of oil.

As illustrated in FIGS. 2A and 2B, the piston 14 has the grooves 40 to 42 above the piston skirt 46, and the piston rings 43 to 45 are respectively attached to these grooves 40 to 42. According to the present embodiment, the tapered portion 52 defined by the wall portions 50*a* and 50*b* suppresses upward leakage of oil from the piston skirt 46. This suppresses oil leakage toward the combustion chamber 13 through gaps between the piston rings 43 to 45 and the grooves 40 to 42.

Figure 4B:
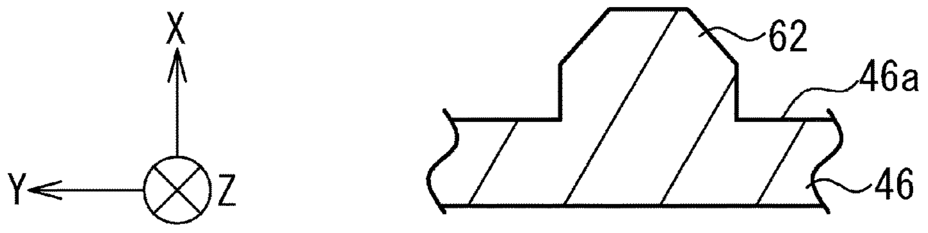
FIG. 4B is a cross-sectional view of a wall portion according to a second variation.
Figure 4C:
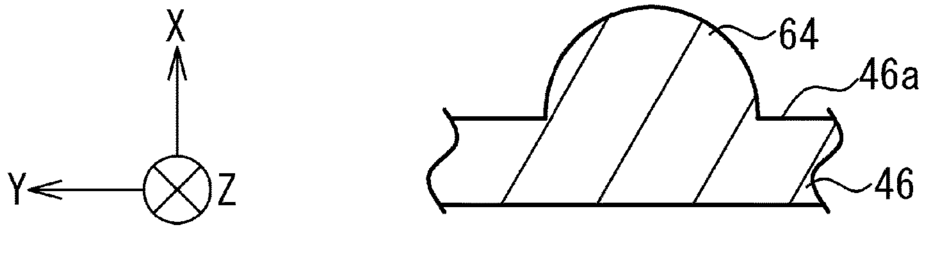
FIG. 4C is a cross-sectional view of a wall portion according to a third variation.

As illustrated in FIG. 3B, the wall portion 50 has a rectangular shape in cross section. The wall portion 50 is easily formed by cutting a certain depth of the piston skirt 46. FIG. 4B is a cross-sectional view of a wall portion 62 according to a second variation. The wall portion 62 has a polygonal shape in cross section. FIG. 4C is a cross-sectional view of a wall portion 64 according to a third variation. The wall portion 64 has a semicircular shape in cross section. In the above manner, the cross-sectional shape of the wall portion may be changed, as long as oil flow is suppressed. The piston 14 may be manufactured by casting or the like other than cutting.

The height H1 of the wall portion 50 is adjusted by controlling the conditions of the cutting process. The height H1 may be equal to or greater than a thickness of the oil film formed between the surface 46*a* of the piston skirt 46 and the inner wall of the bore 19. For example, if the thickness of the oil film is several tens μm, the height H1 may be set to 100 μm to 200 μm. The wall portion 50 blocks oil flow.

Figure 5A:
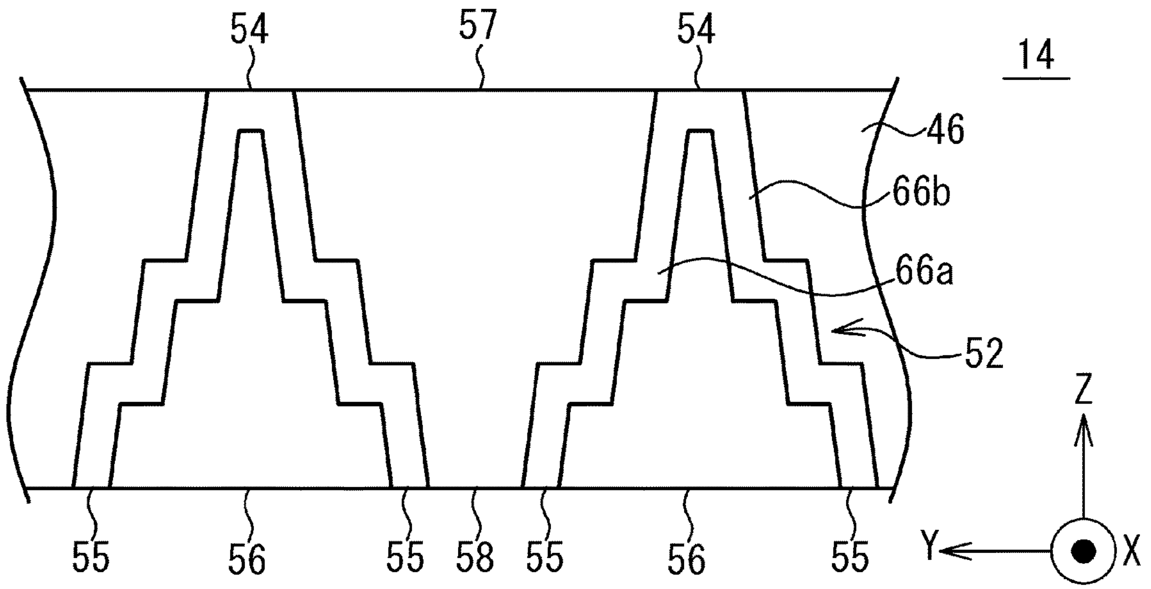
FIG. 5A is an enlarged view of a piston skirt according to a fourth variation.
Figure 5B:
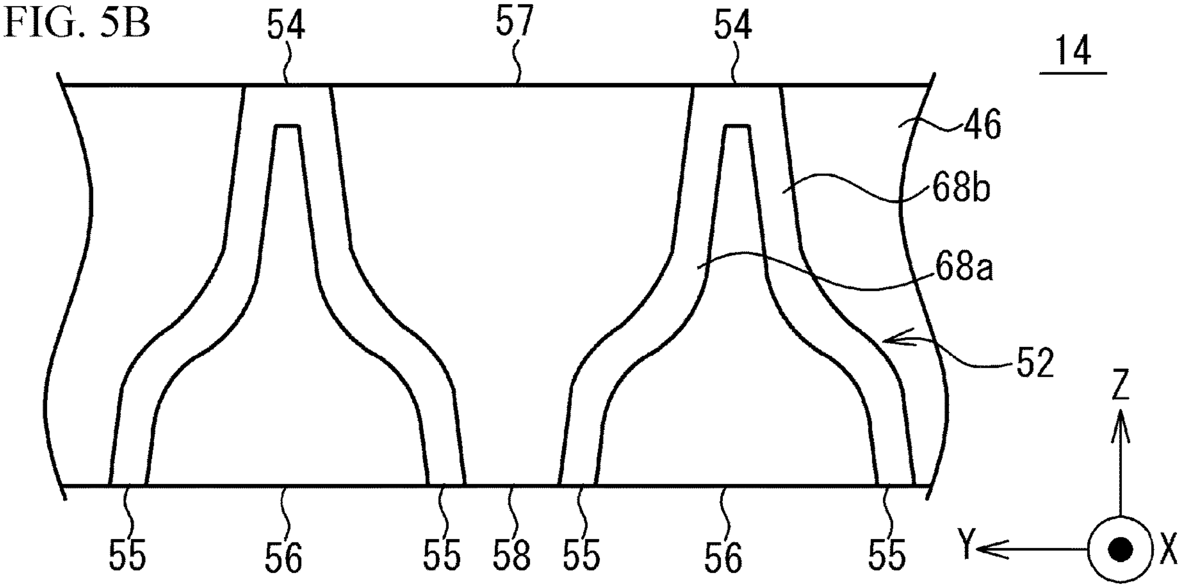
FIG. 5B is an enlarged view of a piston skirt according to a fifth variation.

In the example of FIG. 3A, the wall portions 50*a* and 50*b* extend straight, and these two wall portions define the tapered portion 52 having a V-letter shape. FIG. 5A is an enlarged view of the piston skirt 46 according to a fourth variation. Wall portions 66*a* and 66*b* each has a stepped shape. FIG. 5B is an enlarged view of the piston skirt 46 according to a fifth variation. Wall portions 68*a* and 68*b* each includes curve portions, and meander in the Z-axis direction. These variations also suppress oil leakage, like the present embodiment.

Although some embodiments of the present disclosure have been described in detail, the present disclosure is not limited to the specific embodiments but may be varied or changed within the scope of the present disclosure as claimed.

What is claimed is:

1. A piston comprising:

a piston head; and a piston skirt connected to the piston head, wherein the piston skirt includes wall portions protruding outward from a surface of the piston skirt, the wall portions adjacent to each other in a circumferential direction of the piston skirt are inclined in directions opposite to each other with respect to a direction of movement of the piston in a bore for the piston, and define a tapered portion, the tapered portions are spaced away from each other in the circumferential direction of the piston skirt, and a distance between lower end portions of the tapered portions adjacent to each other is smaller than a distance between upper end portions of the tapered portions adjacent to each other.

2. The piston according to claim 1, wherein the wall portions adjacent to each other are connected to each other at a combustion chamber side of an internal combustion engine in the piston skirt, and are spaced away from each other at a side opposite to the combustion chamber side in the piston skirt.

3. The piston according to claim 1, wherein the distance between the lower end portions of the tapered portions is equal to or less than half of the distance between the upper end portions of the tapered portions.

4. The piston according to claim 1, wherein the wall portions are arranged from one end to another end of the piston skirt in the circumferential direction.

5. The piston according to claim 1, wherein the wall portion extends from an upper end portion of the piston skirt to a lower end portion of the piston skirt.

6. The piston according to claim 1, wherein the piston head includes a groove for attaching a piston ring.

7. The piston according to claim 1, wherein a cross-sectional shape of the wall portion is rectangular.

8. The piston according to claim 1, wherein the wall portion extends straight.

* * * * *